(12) United States Patent
Boyle et al.

(10) Patent No.: US 7,287,556 B2
(45) Date of Patent: Oct. 30, 2007

(54) GAS CAP PROXIMITY MOUNTED FUEL INDICATOR

(76) Inventors: Michael Boyle, 843 Coopers Hawk Ct., Viera, FL (US) 32955; Edgard Schulz, 392 Wingate Cir., Oldmar, FL (US) 34677

( * ) Notice: Subject to any disclaimer, the term of this patent is extended or adjusted under 35 U.S.C. 154(b) by 10 days.

(21) Appl. No.: 11/118,802

(22) Filed: Apr. 29, 2005

(65) Prior Publication Data

US 2005/0241724 A1    Nov. 3, 2005

Related U.S. Application Data

(60) Provisional application No. 60/566,288, filed on Apr. 29, 2004.

(51) Int. Cl.
*B65B 1/04*    (2006.01)
(52) U.S. Cl. ........................... 141/95; 141/198
(58) Field of Classification Search ............ 141/95, 141/198, 86, 311 A; 116/227, 228
See application file for complete search history.

(56) References Cited

U.S. PATENT DOCUMENTS

| 2,756,410 | A |   | 7/1956  | Tobias |
|-----------|---|---|---------|--------|
| 5,506,564 | A |   | 4/1996  | Hargest |
| 5,927,350 | A | * | 7/1999  | Kissinger, Jr. .............. 141/198 |
| 6,002,328 | A | * | 12/1999 | Wallrafen ................ 340/450.2 |
| 7,059,187 | B2| * | 6/2006  | Clarke et al. ................. 73/305 |

* cited by examiner

*Primary Examiner*—Steven O. Douglas
(74) *Attorney, Agent, or Firm*—Beusse Wolter Sanks; Sanks Mora & Maire, P.A.

(57) ABSTRACT

A fuel level indicator indicating a fuel level in a vehicle fuel tank and disposed proximate a cap for closing a refueling orifice extending from the fuel tank. The fuel indicator indicates the fuel level in response to a fuel level sender unit disposed in the fuel tank. According to one embodiment, the fuel level sender unit supplies fuel level information to both a dashboard-mounted gauge and the cap-proximate fuel indicator. A switch supplies power to the cap-proximate fuel indicator and the fuel level sender unit, without powering on other watercraft systems.

18 Claims, 2 Drawing Sheets

GAS CAP PROXIMITY MOUNTED FUEL INDICATOR

The present application claims the benefit under Section 119(e) of the provisional application filed on Apr. 29, 2004 and assigned application No. 60/566,288.

FIELD OF THE INVENTION

The present invention relates generally to fuel gauges or indicators, and specifically to a fuel gauge or indicator for a marine vessel, watercraft or another vehicle having a portable fuel tank.

BACKGROUND OF THE INVENTION

In a typical modern recreational watercraft all informational gauges, including the fuel level gauge, that provide operational and status information to the operator are mounted on a dashboard at the helm. These gauges are useful when operating the watercraft, but are not supplied with power and therefore are not usable when the vessel is in storage, on the trailer, at a fuel pump or at a dock. To determine the fuel level in the vessel, for example, the operator must board the watercraft and activate the fuel gauge by turning on the battery supply.

During a refueling operation the watercraft engine is typically off. Without power, the informational gauges cannot provide status or operational information. Additionally, without visual access to the dash-mounted fuel gauge, the operator cannot determine the fuel level during refueling, resulting in a best guess as to the tank fuel level. Unless the operator climbs aboard the vessel while refueling and activates the fuel level gauge, a significant inconvenience, he is prone to over fill or under fill the fuel tank. In the latter case, the operator may have to return to the dock to refuel earlier than desired. In the former case, the resulting fuel spill wastes fuel and causes environmental damage. Filling the tank to capacity may also be undesirable as the fuel may become stale in the tank due to infrequent use of the vessel.

In addition to the inconveniences associated with using the analog helm-mounted fuel gauge during refueling, the indicated fuel level reading is known to be inaccurate, perhaps as much as 15% inaccurate, due to variations in the battery voltage and inaccuracies associated with the fuel gauge calibration. That is, the gauge is calibrated using a certain fuel tank shape, but the operator's vessel tank shape is likely different therefrom, resulting in inaccurate readings as to the quantity of fuel remaining in the tank.

SUMMARY OF THE INVENTION

According to one embodiment, the present invention comprises a fuel level indicating apparatus for a vehicle comprising a fuel tank and a refill orifice through which fuel is supplied to the tank, wherein the orifice is removably sealed with a cap. The fuel level indicating apparatus further comprises a fuel level detector for determining a fuel level in the tank and a fuel level indicator responsive to the fuel level detector for mounting proximate the cap to permit viewing of the fuel level during a refueling operation.

The invention further comprises a method for refueling a watercraft fuel tank comprising a refuel orifice and a cap for removably sealing the orifice. The method further comprises activating a fuel level indicator for displaying a tank fuel level, wherein the indicator is disposed on a surface of the watercraft proximate the cap and monitoring the fuel level during the refueling operation.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
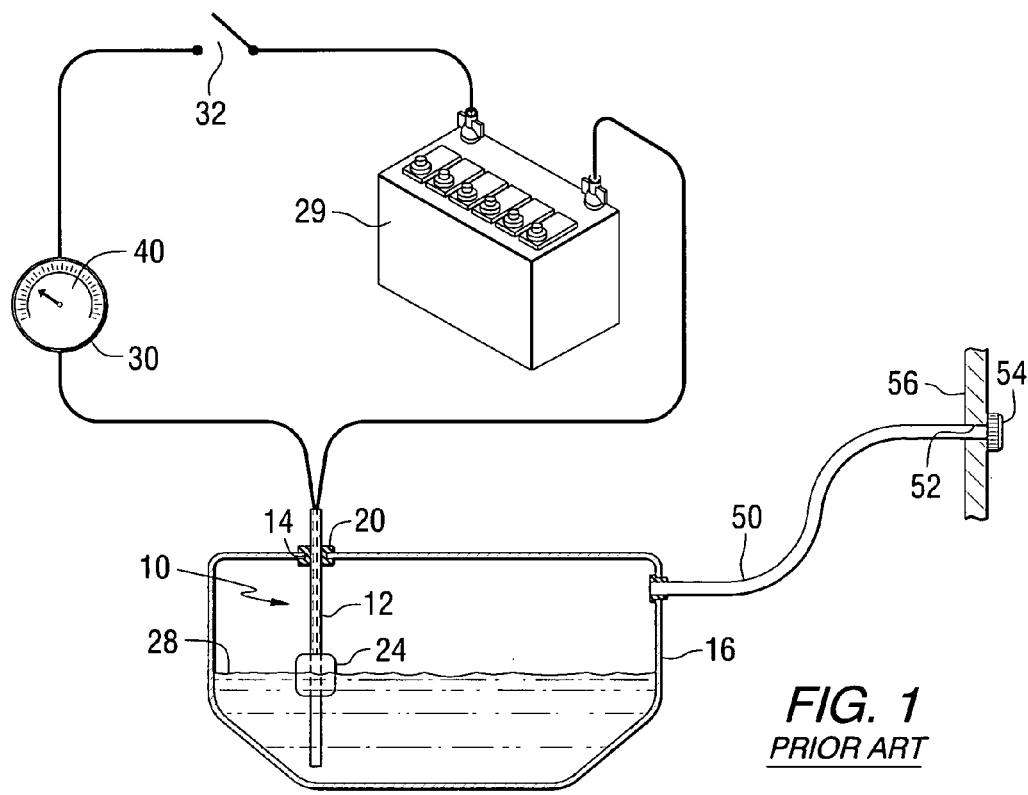
FIG. 1 illustrates fuel level detecting and displaying elements according to the prior art.

Before describing in detail a particular fuel indicator apparatus according to the teachings of the present invention, it should be observed that the present invention resides primarily in a novel and non-obvious combination of elements. So as not to obscure the disclosure with details that will be readily apparent to those skilled in the art, certain conventional elements have been presented with lesser detail, while the drawings and the specification describe in greater detail other elements pertinent to understanding the invention. The following preferred embodiment is an application of the present invention and is not intended to define limits as to the structure of the invention, but only to provide exemplary constructions.

For measuring fuel level, a conventional watercraft comprises a fuel level sender unit 10 (see FIG. 1) affixed to a bracket 12 suspended through an opening 14 in a fuel tank 16. A fitting 20 supports the bracket 12 and seals the opening 14. To determine the fuel level, the fuel level sender unit comprises a float level sensor or fuel level detector 24, movably attached to the bracket 12, drives a rheostat (not shown) within the detector 24, varying the rheostat resistance in response to a fuel level 28.

A current is supplied from a watercraft battery 29 through a dash-mounted fuel gauge 30 and the fuel level detector 24. Since the resistance of the detector 24 varies according to the fuel level, the current flow through the fuel gauge 30 also varies according to the fuel level and drives an indicator that displays the fuel level. A transducer within the fuel gauge 30 provides an analog read-out of the fuel level 28 on a face 40 in response to the detected current, based on industry-standard resistance values as correlated to a tank fuel level. Generally, a resistance of about 240 ohms indicates an empty tank and a resistance of about 33 ohms indicates a full tank. A continuous range of resistance values between these two end points indicates fuel levels between empty and full. As can be appreciated, other resistance values can be used to indicate the fuel level. An ignition switch 32 must be closed to close the circuit and provide a fuel level reading.

The operator supplies fuel to the tank 16 through a fuel refill tube 50 comprising an orifice 52 in fluid communication with the gas tank 16 and a tank cap 54 for sealing the orifice 52. Typically, the orifice 52 is mounted within a gunwale region 56 of the vessel.

Figure 2:
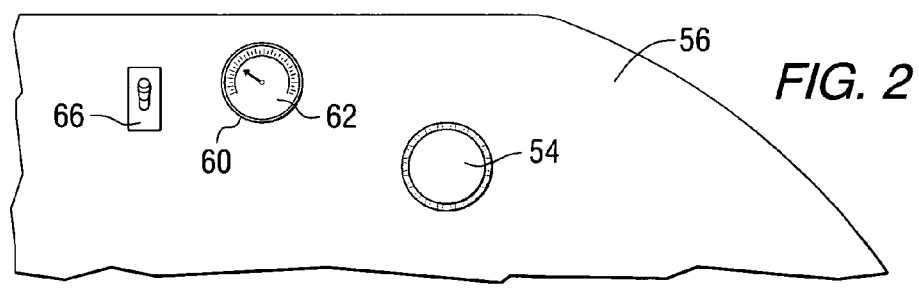
FIGS. 2 and 3 illustrate embodiments of a gas cap proximity mounted fuel indicator according to the teachings of the present invention.

In a preferred embodiment as illustrated in FIG. 2, the present invention comprises a fuel level indicator 60 (further comprising an analog display 62) and an activation switch 66, both operating in conjunction with the fuel level sender unit 10 of FIG. 1. The indicator 60 and the switch 66 are mounted within the gunwale region 56 of the hull, proximate the orifice 52 (see FIG. 1). With the indicator 60 disposed in view of the cap 54, the operator is advantageously provided a real-time fuel level indication during the refueling operation.

To replenish the fuel in the fuel tank 16, the operator activates the fuel sender unit 10 and the indicator 60 by operation of the activation switch 66. In response, the indicator 60 provides the operator with an indication of the fuel level 28 in the fuel tank 16 before, during and after refueling. In a preferred embodiment, activation of the switch 66 supplies power only to the indicator 60 and the fuel sender unit 10, thus avoiding powering all systems of the watercraft when determining the fuel level.

Figure 3:
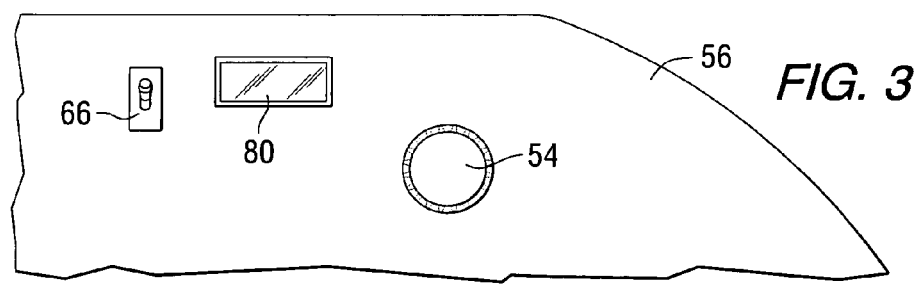

The present invention can be implemented with either the analog display 62 of the indicator 60 illustrated in FIG. 2 or with a digital indicator 80 illustrated in an alternative embodiment of FIG. 3. The activation switch 66 can be integrated with the indicator 60/80 or mounted to the hull as a separate component. The indicator 60/80 is user-programmable to indicate the fuel level in gallons or as a percentage of fuel tank capacity.

Those skilled in the art recognize that the gas cap proximate fuel indicator of the present invention can be operated with fuel level detectors other than the variable resistance type described above in conjunction with FIG. 1. For example, certain conventional fuel level detectors may proportionally vary other electrical parameters (e.g., capacitance, conductance) to indicate fuel level.

Figure 4:
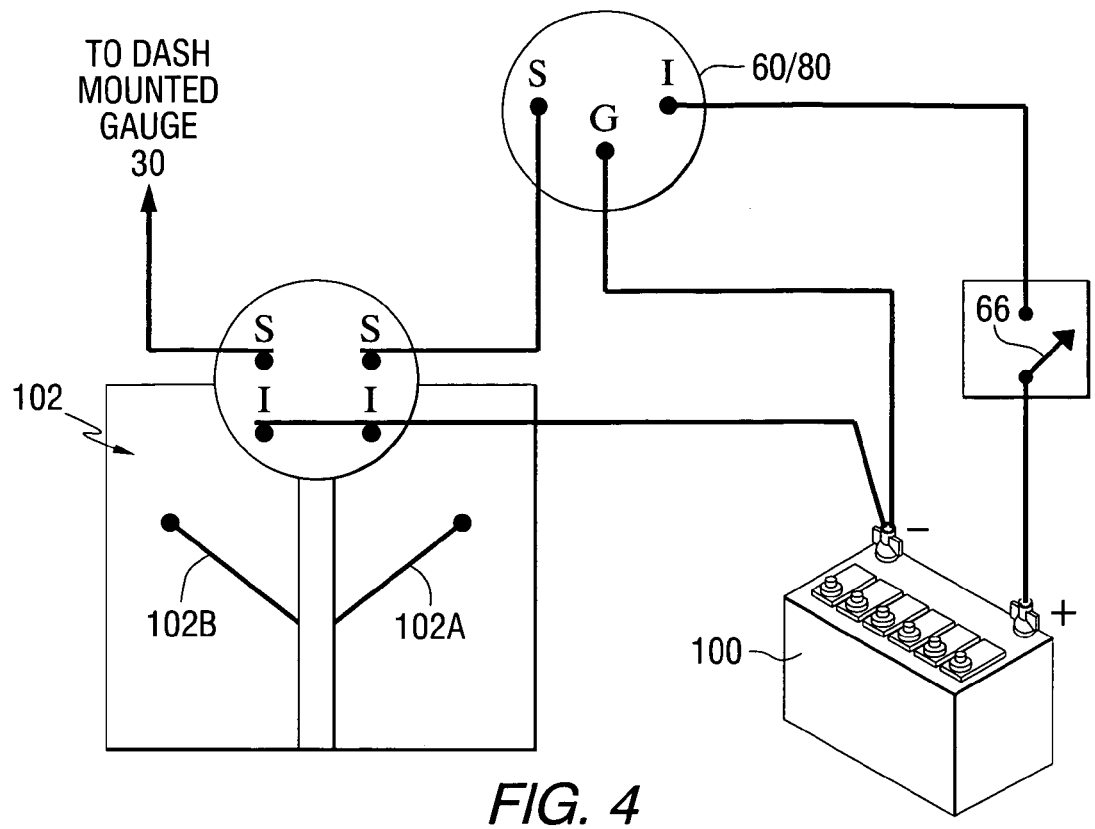
FIG. 4 illustrates an electrical schematic for the gas cap proximity mounted fuel indicator of FIGS. 2 and 3.

FIG. 4 is a schematic diagram of certain components associated with the present invention. Those skilled in the art recognize that the schematic of FIG. 4 is merely exemplary, as other circuit designs will provide similar functionality and interoperability for the components. In a closed state, the activation switch 66 provides serial current flow from a battery 100 to the indicator 60/80, specifically to indicator I and G terminals, as illustrated. A level detector 102A of a dual fuel sender unit 102 is connected to the battery 100 and the indicator 60/80 as shown such that current is supplied to the level detector 102A. A signal representative of the fuel level as determined by the level detector 102A is supplied to the indicator 60/80 for display to the operator.

When the operator desires to activate the indicator 60/80, she operates the switch 66 to a closed state and in response receives a fuel level indication on the indicator 60/80 as determined by the level detector 102A. When the cap-proximate indicator 60/80 is not in use the switch 66 is in an open state to prevent battery drain.

The level detector 102B operates similarly to the fuel level detector 102A to provide a signal representative of the fuel level to the dash-mounted gauge 30 when the vessel ignition switch is closed.

As described, the dual fuel sender 102 of FIG. 4 comprises two independently operable fuel level detectors 102A and 102B. The use of a dual fuel sender unit may be desired to accommodate the gas cap proximate fuel indicator of the present invention, as two fuel level measurements are provided by the dual fuel sender unit 102, one measurement supplied by the element 102B to the dash-mounted fuel gauge 30 and the other supplied by the element 102A to the gas cap proximate fuel indicator 60/80 of the present invention. Use of the dual sender unit 102 simplifies implementation of the gas cap proximity mounted gauge of the present invention, as an electrical connection between the dash mounted gauge 30 and the gas cap proximate indicator 60/80 is not required. Those skilled in the art recognize that a second fuel level detector (e.g., the fuel level detector 102A) independently operable from the first fuel level detector (e.g., the fuel level detector 102A) can be easily added to an existing single element fuel sender unit to more conveniently accommodate the gas cap proximate indicator 60/80.

Figure 5:
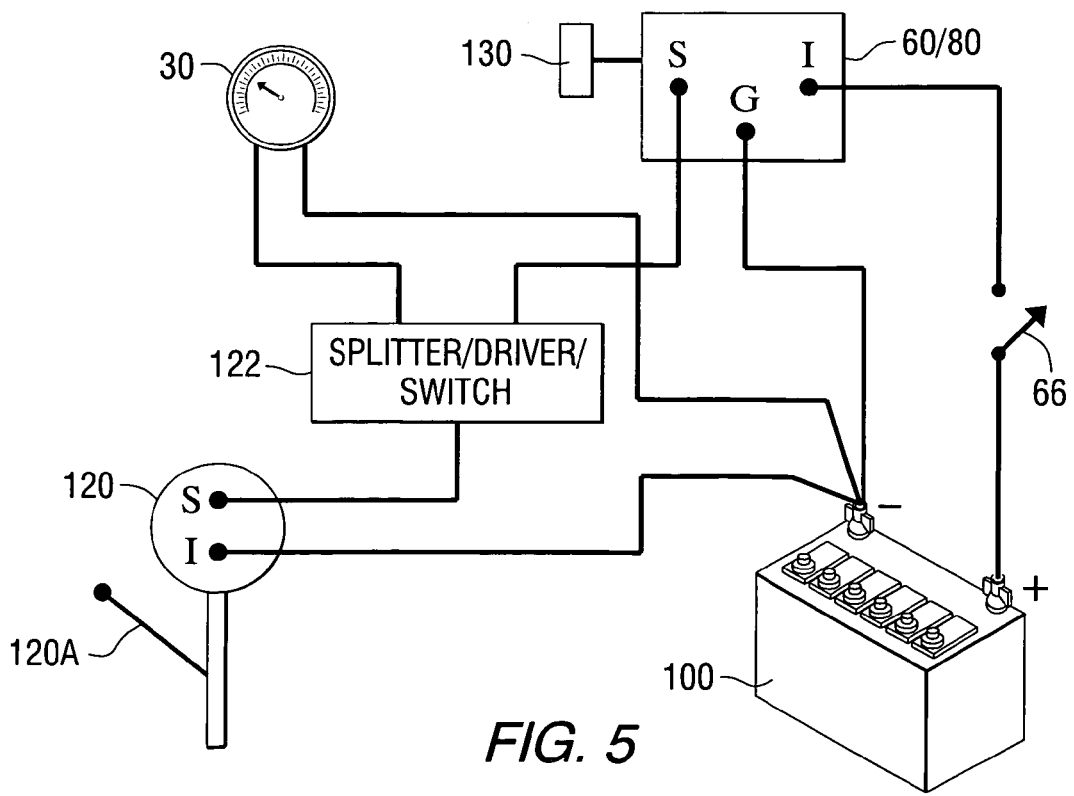
FIG. 5 illustrates an alternative fuel level sending unit for use with the gas cap proximity mounted fuel indicator of the present invention.

In another embodiment of FIG. 5, a single fuel level sender unit 120 comprising a fuel level detector 120A supplies a level-indicating signal to both the dash mounted fuel gauge 30 and the gas cap proximate fuel indicator 60/80 through an electrical splitter/driver/switch 122. According to one embodiment, the splitter/driver/switch 122 is implemented as a transistor switch (and associated components). The splitter/driver/switch 122 comprises an analog-to-digital converter that samples the current supplied to the fuel level detector 120A, which is responsive to the fuel level 28 in the fuel tank 16 (see FIG. 1), and converts the current to a resistance value indicative of the fuel level. Responsive to the resistance value, the indicator 60/80 displays the tank fuel level.

Preferably, the battery 100 illustrated in FIGS. 4 and 5 comprises a watercraft battery that supplies power to various onboard systems, and in response to a closed state of the switch 66 also supplies power to the fuel sender unit 102/120 and the indicator 60/80. In an alternative embodiment, power for the fuel sender unit 102/120 and the indicator 60/80 is supplied from a separate battery, such as a 9-volt battery (not shown) mounted proximate the indicator 60/80.

According to another embodiment of the invention, the indicator 60/80 includes a user-operated switch 130 (see FIG. 5) that causes the battery voltage to be displayed on the indicator 60/80 for the operator's convenience.

In yet another embodiment, the indicator 60/80 (and the elements providing the fuel-level representative signal thereto) is automatically powered down after a predetermined interval. This is a convenient feature to avoid battery drain if the operator fails to open the switch 66 after completing the fueling operation.

The teachings of the present invention can also be applied to other types of land, air and water vehicles (e.g., automobiles, trucks, planes, motorcycles, boats, railroad locomotive, land-based tired vehicles) to afford the operator with a real time indication of the tank fuel level during a refueling operation.

An apparatus has been described as useful for forming indicating fuel level in a watercraft fuel tank. Specific applications and exemplary embodiments of the invention have been illustrated and discussed, which provide a basis for practicing the invention in a variety of ways and with a variety of structures. Numerous variations are possible within the scope of the invention. Features and elements associated with one or more of the described embodiments are not to be construed as required elements for all embodiments. The invention is limited only by the claims that follow.

What is claimed is:

1. A fuel level indicating apparatus for a vehicle comprising a fuel tank and a refill orifice through which fuel is supplied to the tank, wherein the orifice is removably sealed with a cap, the indicating apparatus comprising:

a fuel level detector for determining a fuel level in the tank;

a power supply for supplying electrical current to the fuel level detector; and a fuel level indicator responsive to electrical current from the fuel level detector, the fuel level indicator for determining a parameter of the electrical current related to the fuel level and for displaying a fuel level indication, responsive to the parameter, that changes as fuel is supplied to the tank, the fuel level indicator being mounted on a surface coincident with the mounting of the cap to permit viewing of the fuel level during a refueling operation.

2. The fuel level indicating apparatus of claim 1 further comprising a switch operable to a closed or an open state and responsive to the power supply for switchably supplying power to the fuel level detector and the fuel level indicator in response to operator operation of the switch to the closed state.

3. The fuel level indicating apparatus of claim 2 wherein the vehicle further comprises a plurality of systems operable in response to the power supply, and wherein the switch supplies power only to the fuel level detector and the fuel level indicator when in the closed state.

4. A fuel level indicating apparatus for a vehicle comprising a fuel tank and a refill orifice through which fuel is supplied to the tank, wherein the orifice is removably sealed with a cap, the indicating apparatus comprising:

a fuel level detector for determining a fuel level in the tank;

a power supply for supplying electrical current to the fuel level detector; and a fuel level indicator responsive to electrical current from the fuel level detector, the fuel level indicator for determining a parameter of the electrical current related to the fuel level and for displaying a fuel level indication, responsive to the parameter, that changes as fuel is supplied to the tank, the fuel level indicator for mounting proximate the cap to permit viewing of the fuel level during a refueling operation, the vehicle further comprising a dashboard and a dashboard-mounted fuel level indicator disposed therein, wherein the dashboard-mounted fuel level indicator provides fuel level information in response to the fuel level detector.

5. The fuel level indicating apparatus of claim 4 wherein the fuel level detector comprises a first and a second fuel level detector, and wherein the first fuel level detector provides fuel level information to the dashboard-mounted fuel level indicator, and wherein the second fuel level detector provides fuel level information to the fuel level indicator mounted proximate the cap.

6. The fuel level indicating apparatus of claim 1 wherein the vehicle comprises one of a boat, a plane, an automobile, a truck, a motorcycle, a railroad locomotive, a watercraft and a land-based tired vehicle.

7. The fuel level indicating apparatus of claim 1 wherein the fuel level indicator comprises an analog display or a digital display.

8. The fuel level indicating apparatus of claim 1 wherein the vehicle comprises a watercraft, and wherein the fuel level indicator and the cap are mounted in a region of a gunwale of the watercraft.

9. The fuel level indicating apparatus of claim 1 wherein the fuel level indicator displays the fuel level as a number of gallons remaining in the tank or as a percentage of tank capacity.

10. An apparatus for a vehicle comprising a fuel tank and a refill orifice through which fuel is supplied to the fuel tank, wherein the refill orifice is removably sealed with a cap, the apparatus comprising:

a fuel level detector for determining a fuel level in the tank;

a battery;

a fuel gauge disposed for operator viewing of the fuel level while operating the vehicle and for displaying a tank fuel level during vehicle operation;

a fuel level indicator for mounting proximate the cap to permit viewing of the fuel level during a refueling operation;

a switch;

an electronics module;

wherein a first battery terminal is electrically connected to a first indicator terminal through the switch;

wherein a second battery terminal is electrically connected to a second indicator terminal, to a first detector terminal and to a first fuel gauge terminal; and wherein a third indicator terminal, a second fuel gauge terminal and a second detector terminal are electrically connected to the electronics module.

11. The apparatus of claim 10 wherein the electronics module produces a first signal supplied to the fuel gauge for indicating a fuel level in the fuel tank and a second signal supplied to the fuel level indicator for indicating a fuel level in the fuel tank in response to a closed state of the switch.

12. The apparatus of claim 10 wherein the electronics module produces a third signal supplied to the fuel level indicator for indicating a battery voltage.

13. The apparatus of claim 10 wherein the electronics module produces a fourth signal supplied to the fuel indicator for indicating a fuel level in the fuel tank as a percentage of fuel tank capacity.

14. The apparatus of claim 10 wherein the vehicle comprises one of a boat, a plane, an automobile, a truck, a motorcycle, a railroad locomotive, a watercraft and a land-based tired vehicle.

15. An apparatus for a vehicle comprising a fuel tank and a refill orifice through which fuel is supplied to the fuel tank, wherein the refill orifice is removably sealed with a cap, the apparatus comprising:

a first fuel level detector for determining a fuel level in the tank;

a second fuel level detector for determining the fuel level in the tank;

a battery;

a fuel gauge disposed for operator viewing while operating the vehicle and for displaying a tank fuel level during vehicle operation; and a fuel level indicator disposed proximate the cap to permit viewing of the fuel level during a refueling operation, a switch;

wherein a first battery terminal is electrically connected to a first indicator terminal through the switch;

wherein a second battery terminal is electrically connected to a second indicator terminal, to a first terminal of the first detector, to a first terminal of the second detector and to a first fuel gauge terminal;

wherein a third indicator terminal is electrically connected to a second terminal of the first detector; and wherein a second fuel gauge terminal is electrically connected to a second terminal of the second detector.

16. The fuel level indicating apparatus of claim 15 wherein operation of the switch to a closed state activates the fuel level indicator for displaying the tank fuel level.

17. A fuel level indicating apparatus for a vehicle, wherein the vehicle comprises a fuel tank and a refill orifice through which fuel is supplied to the tank, wherein the orifice is removably sealed with a cap, the vehicle further comprising a fuel level detector for providing an indication of the amount of fuel in the tank and a fuel gauge responsive to the fuel level detector for displaying a value related to the amount of fuel in the tank, wherein the fuel gauge is disposed for operator viewing while operating the vehicle, the indicating apparatus comprising:

a fuel level indicator for physical mounting on the vehicle in a location viewable during a refueling operation;

a first electrical conductor for connecting to the vehicle battery;

a second electrical conductor for connecting to the fuel gauge; and a third electrical conductor for connecting to the fuel detector.

18. A method for refueling a watercraft fuel tank comprising a refuel orifice and a cap for removably sealing the orifice, the method comprising:

supplying electrical current to a fuel level detector;

determining a parameter of electrical current supplied from the fuel level detector to a fuel level indicator for displaying a tank fuel level responsive to the parameter, wherein the displayed fuel tank level changes as fuel is supplied to the tank during refueling, and wherein the fuel level indicator and the cap are disposed on a common surface of the watercraft; and monitoring the fuel level during the refueling operation.

* * * * *